No. 852,948. PATENTED MAY 7, 1907.
W. P. GEHRIS.
LATHE TOOL.
APPLICATION FILED MAR. 23, 1906.
3 SHEETS—SHEET 1.
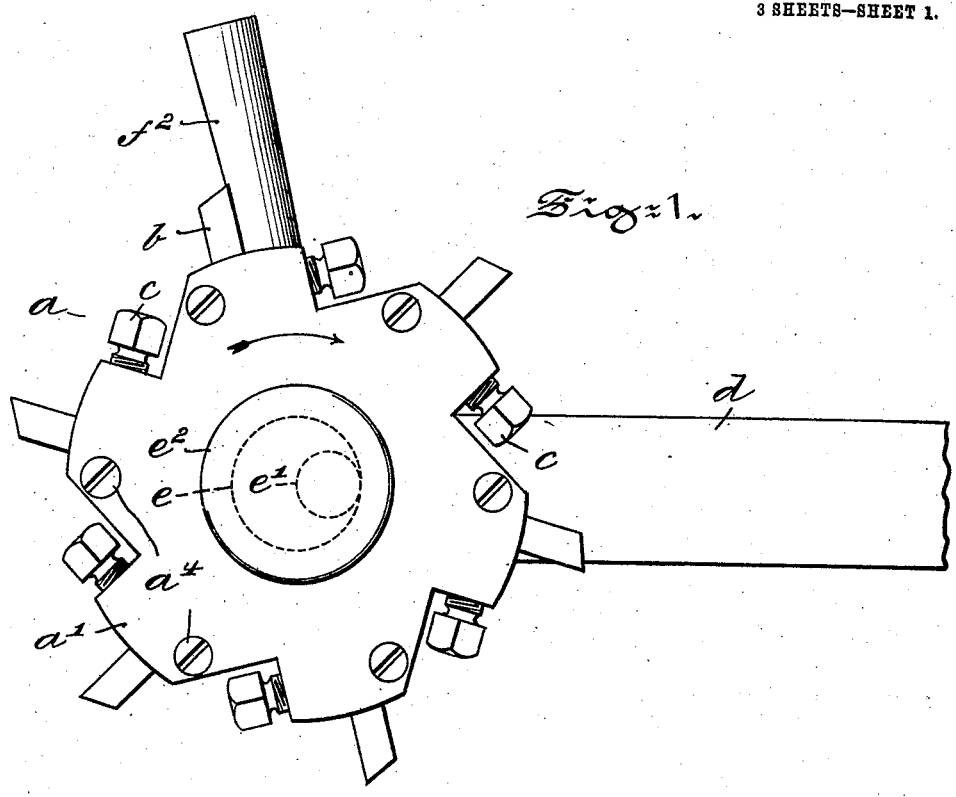
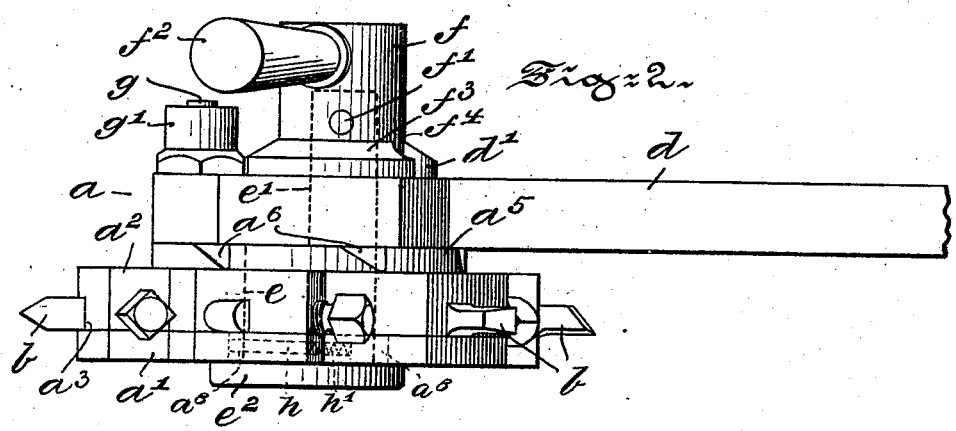
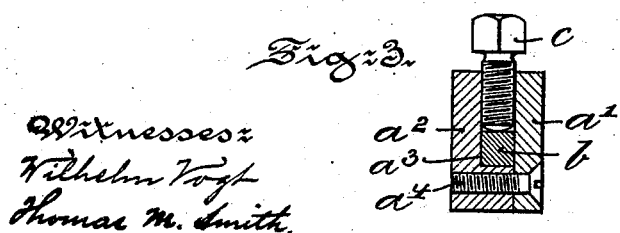
Witnesses:
Wilhelm Vogt
Thomas M. Smith
Inventor:
William P. Gehris,
By J. Walter Douglass
Attorney No. 852,948. PATENTED MAY 7, 1907.
W. P. GEHRIS.
LATHE TOOL.
APPLICATION FILED MAR. 23, 1906.
3 SHEETS—SHEET 2.
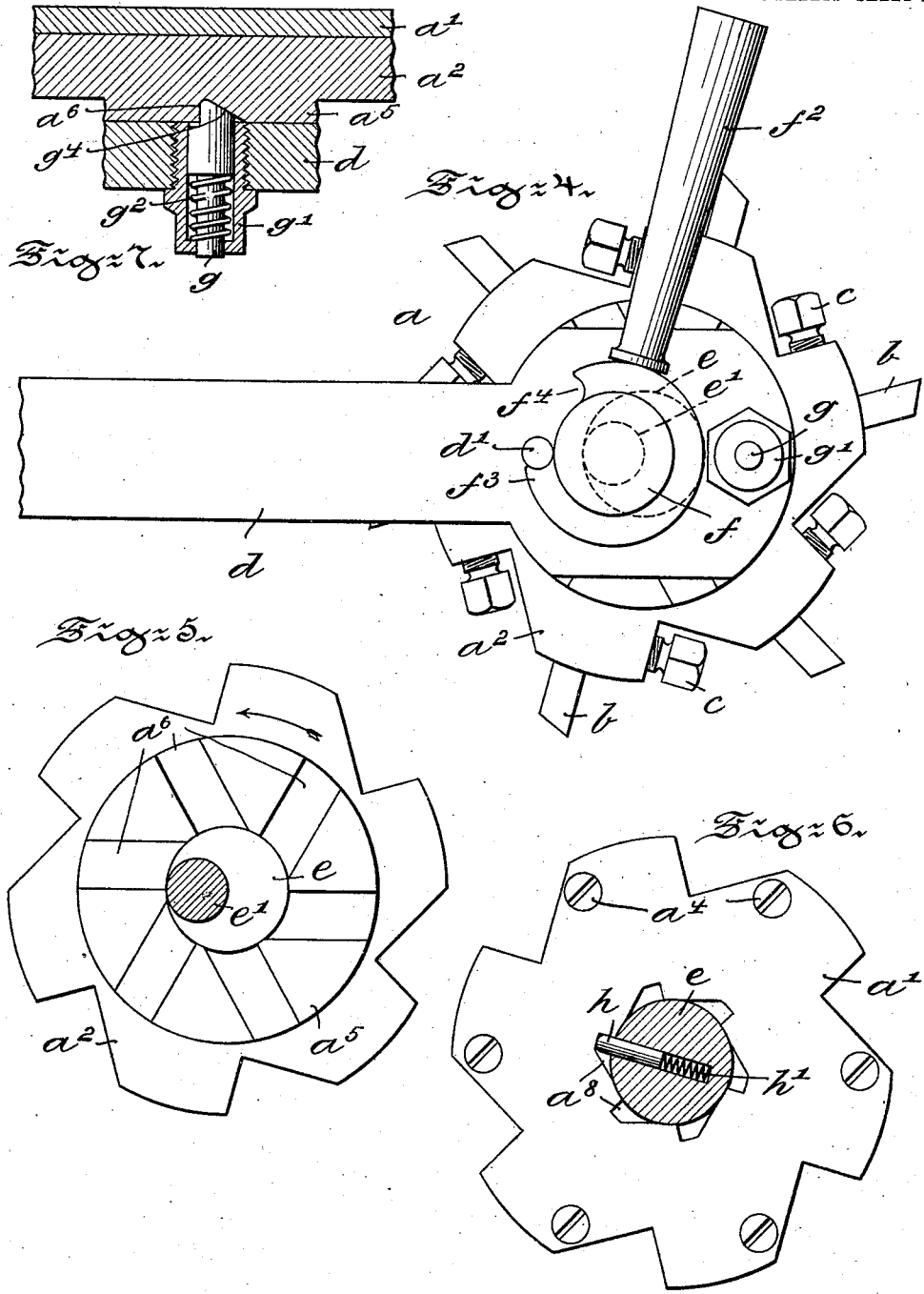

No. 852,948. PATENTED MAY 7, 1907.
W. P. GEHRIS.
LATHE TOOL.
APPLICATION FILED MAR. 23, 1906.
3 SHEETS—SHEET 3.
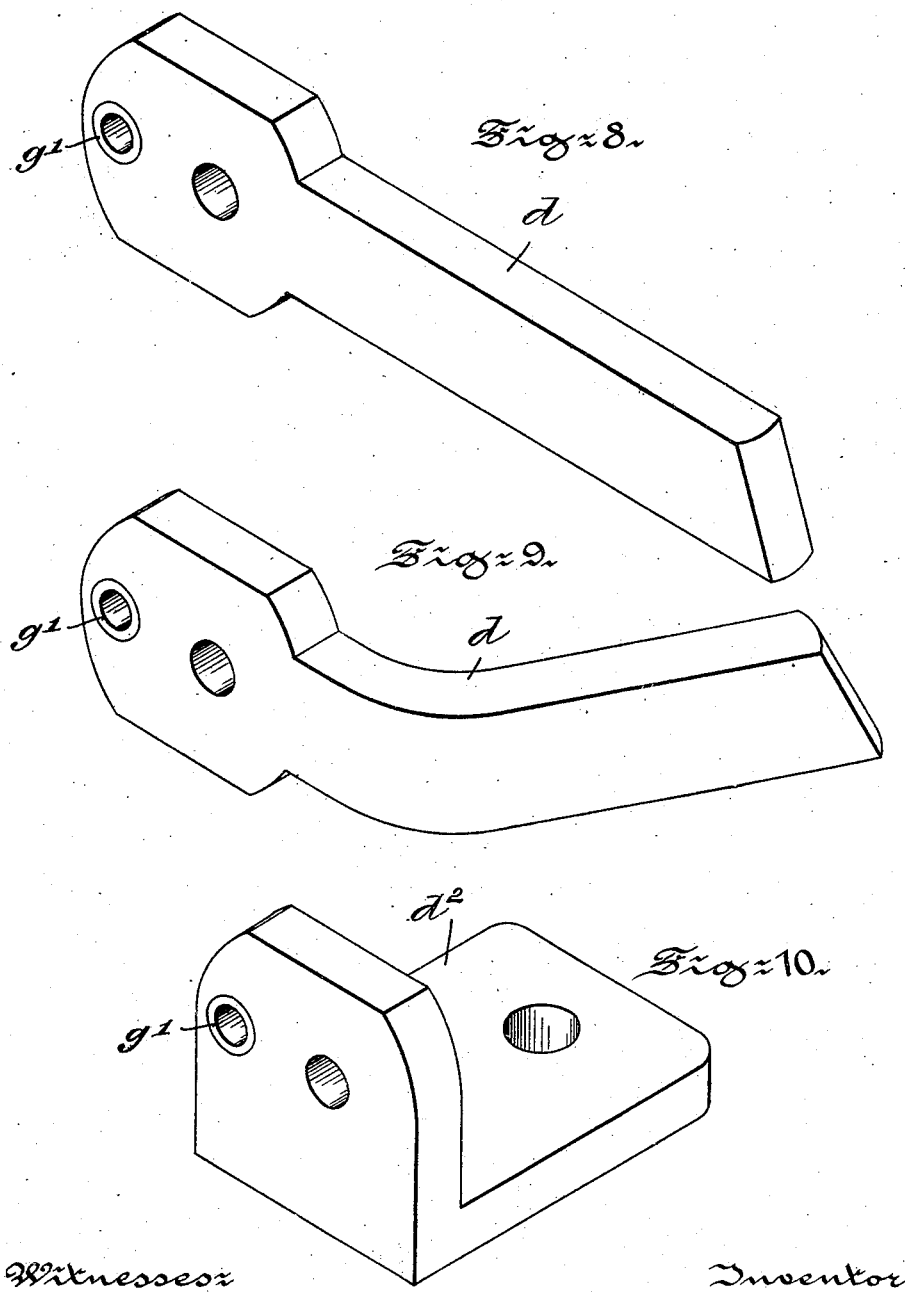

UNITED STATES PATENT OFFICE.

WILLIAM P. GEHRIS, OF READING, PENNSYLVANIA.

LATHE-TOOL.

No. 852,948.      Specification of Letters Patent.      Patented May 7, 1907.

Application filed March 23, 1906. Serial No. 307,561.

*To all whom it may concern:*

Be it known that I, WILLIAM P. GEHRIS, a citizen of the United States, residing at the city of Reading, in the county of Berks and State of Pennsylvania, have invented certain new and useful Improvements in Lathe-Tools, of which the following is a specification.

My invention has relation to a lathe tool; and in such connection it relates to the combining in one tool, of a number of tools adapted to be brought separately into an operative position for use in the lathe, as required.

The principal objects of my invention are first, to provide a holder for a plurality of tools commonly used in conjunction with lathes so as to permit of the finishing of an article, without removing the same from the centering spindles of the lathe; second, to provide the holder with means for bringing and holding the tool required into an operative position; third, to so arrange the holder that the tools can be readily inserted or removed from the holder; and fourth, to provide supports for the holder to connect the same with the tool post of the lathe or directly with the carriage for the post.

The nature and scope of my present invention will be more fully understood from the following description taken in connection with the accompanying drawings forming part hereof, in which Figures 1 and 2, are views, illustrating respectively in front and in side elevation the lathe tool, consisting of a holder for a plurality of tools, means for removably connecting the tools with the holder, and means for supporting the holder in the support therefor, all embodying main features of my said invention. Fig. 3 is a view, illustrating partly in section and partly in elevation, the manner of connecting the sections of the holder with each other and of clamping the tools to the holder. Fig. 4 is a rear elevational view of the holder, illustrating the means for limiting the reciprocatory movement of a handle and thus of the rotation of the holder in one direction. Fig. 5 is a detail view, illustrating partly in elevation and partly in section the holder removed from the support therefor, a shaft adapted to rotate in said support to impart to the holder and tool occupying an operative position longitudinal movements toward and away from the work and grooves in the rear face of said holder to permit of the locking of said holder and tools in the position given. Fig. 6 is a similar view, illustrating partly in elevation and partly in section, the front face of the holder, notches arranged therein, and a spring controlled bolt carried by the shaft of said holder to transmit its rotary movement to the holder so as to rotate the same by a step-by-step movement in one direction. Fig. 7 is a detail view, enlarged, illustrating partly in section and partly in elevation the sectional holder, the support for the same, and a spring controlled bolt arranged in the support for locking the holder in each position given. Fig. 8 is a perspective view of the support for the tool adapted to connect the same with the tool post of the lathe. Fig. 9 is a similar view, illustrating a support for holding the tool sidewise to the carriage of the lathe to clear the same; and Fig. 10 is a similar view, of a knee-support for the tool adapted to connect the same directly to the carriage of the lathe.

Referring to the drawings $a$, represents the tool, consisting of a holder for a plurality of individual tools $b$, such as are commonly used in lathes. The holder $a$, preferably consists of two sections $a^1$ and $a^2$, the section $a^2$, of which is provided with grooves $a^3$, adapted to receive and hold in a radial position tools $b$, while the section $a^1$, connected with the section $a^2$, by means of screws $a^4$, serves to bear against the tools $b$, and thus to assist in holding the tools in position in the section $a^2$. However, set-screws $c$, arranged in the section $a^2$, and engaging the tools $b$, in the manner shown in Fig. 3, permit of the locking and unlocking of the tools from the holder $a$, while the section $a^1$, when removed from the section $a^2$, permits of a ready access being had to the tools in case broken within the holder $a$, and require a removal of the broken portion therefrom. The sections $a^1$ and $a^2$, are rotatably secured to a support $d$, by the eccentrically arranged portion $e^1$, of a shaft $e$, which passes through the sections $a^1$ and $a^2$, and terminates in a head $e^2$, bearing against the section $a^1$, as shown in Fig. 2. Beyond the support $d$, the section $e^1$, of the shaft $e$, is engaged by a head $f$, removably secured thereto by a bolt $f^1$, while a handle $f^2$, arranged in the head $f$, permits of the turning of the same, and thus of the shaft $e$, in the support $d$. A flange $f^3$, preferably formed integral with the head $f$, and a bolt $d^1$, engaging a recess $f^4$, of the flange $f^3$, serves to limit the movements of the shaft $e$, in the support $d$, for a purpose to be presently more fully described.

In order to prevent the transmission of the rotary movement of the shaft $e$, to the holder $a$, in one direction, the section $a^2$, thereof, is provided with a disk-shaped projection $a^5$, having grooves $a^6$, arranged substantially radially therein. One of these grooves $a^6$, at a time is engaged by a bolt $g$, having a range of movement within a housing $g^1$, removably secured to the support $d$, and held in engagement with the particular groove $a^6$, by a spring $g^2$. As shown in Fig. 7, the grooves $a^6$, are inclined in one direction and the bolt $g$, is provided with a correspondingly inclined portion $g^4$, to permit of the rotation of the holder $a$, by the shaft $e$, in the direction indicated by the arrow in Figs. 1 and 5, but prevents a rotation in a direction opposite to that indicated by the same.

The preferred mechanism for transmitting the rotary movement of the shaft $e$, to the holder $a$, to rotate the same with a step-by-step movement in the direction indicated by the arrow in Fig. 1, to bring the tool $b$, required into an operative position with respect to the article to be worked by the same is as follows:—As shown in Fig. 6, the shaft $e$, opposite the section $a^1$, of the holder $a$, is provided with a bolt $h$, slidably arranged therein and held in engagement with one of the ratchet notches $a^8$, arranged in the section $a^1$, by the spring $h^1$. When the shaft $e$, is rotated in the direction of the arrow as indicated in Figs. 1 and 5, by means of the handle $f^2$, this movement by the intervention of the bolt $h$, is transmitted to the section $a^1$, and the holder is rotated for a distance limited by the recess $f^4$, of the head $f$, and the bolt $d^1$, of the support $d$. Owing to the eccentric position of the shaft portion $e^1$, with respect to the shaft $e$, which portion rotates within the support $d$, while the portion $e$, rotates within the holder $a$, the holder has imparted to it in addition to the rotary movement a longitudinal movement in the direction of the contracted end of the support $d$. By this movement the tool $b$, held in engagement with the work supported by the spindles of the lathe, not shown, is brought out of engagement with the same. During the movement of the handle $f^2$, into the normal position shown in Figs. 1, 2 and 4, the holder $a$, and the tool $b$, thus moved into the operative position, is swung forward into engagement with the work. During the substantially longitudinal backward movement of the holder $a$, toward the contracted end of the support $d$, the holder $a$, is prevented from being rotated beyond the distance of one groove $a^6$, to the other by the bolt $g$, which offers a sufficient friction to the holder $a$, to stop the further rotation thereof by any momentum the holder $a$, may have acquired by being quickly rotated by the bolt $h$, of the shaft $e$. During the forward movement of the holder $a$, the bolt $g$, by engaging a groove $a^6$, positively prevents the rotary movement of the holder $a$, on the support $d$, by the shaft $e$, and also serves to support the holder $a$, when one of the tools thereof engages the work. By the above described arrangement of the holder $a$, the tools $b$, carried by the same, may be brought successively, into an operative position, or may be turned until the tool required is moved into this position.

The support $d$, which connects the tool $a$, to the tool-post of a lathe carriage, not shown, may be straight, as shown in Fig. 8, or may be bent as shown in Fig. 9, in order to clear the carriage of the lathe. For heavy work, however, the knee-support $d^2$, shown in Fig. 10, may be used, which owing to its shape can be directly bolted to the carriage.

Having thus described the nature and objects of my invention, what I claim as new and desire to secure by Letters Patent is:—

1. A tool for lathes, comprising a holder consisting of two sections, whereof one section is provided with substantially radial grooves in each of the faces thereof and whereof the second section is provided with ratchet notches, a support, a shaft connecting said sections with said support and having an eccentrically arranged extension passing through said support, means movably arranged in said shaft and engaging the ratchet notches of said second section, means movably arranged in said support and engaging the grooves of said first section contiguous to said support, tools arranged in the grooves of said first section contiguous to said second section, said shaft when rocked in said support adapted by the movable means located therein to rotate said first and by the same said second section in one direction and by the eccentric extension to shift said sections longitudinally to said support to bring the tools carried by one of said sections first into an inoperative and then back into an operative position, and the movable means of said support adapted to prevent turning of said sections in one direction.

2. A tool for lathes, comprising a holder, consisting of two sections, whereof one section is provided with substantially radial grooves in each of the faces thereof, and whereof the second section is provided with ratchet notches, a support, a shaft connecting said sections with said support and having an eccentrically arranged extension passing through said support, means engaging said extension and adapted to connect said shaft with said support, a bolt movably arranged in said shaft and engaging the ratchet notches of said second section, a bolt movably arranged in said support and engaging the grooves of said first section contiguous to said support, said shaft when rocked in said support adapted by the bolt arranged therein to rotate said first and by the same said second section in one direction and by its eccentric extension to shift said sections and working tools arranged in grooves of the first section thereof longitudinally to said support first into an inoperative and then back into an operative position and the bolt of said support adapted to prevent turning of said sections in one direction.

3. A tool for lathes, comprising a holder provided with ratchet notches and two series of radial grooves, one series adapted to receive tools, the other having inclined sides, means for clamping the tools to said holder and for holding the same in position in their respective grooves, a support, a shaft having portions eccentrically arranged with respect to each other and adapted to connect the sections to said support, a head having a recessed flange engaging said shaft and adapted to connect the shaft to said support and rotate the same, means carried by said support and adapted to limit the rotary movement of said head and by the same said shaft, by alternately engaging the end portions of the recessed flange of said head, a spring controlled bolt carried by one portion of said shaft and adapted to engage the ratchet notches of one of said sections to transmit the movement of said shaft to said sections, a spring controlled bolt arranged in said support and adapted to engage the second series of grooves in the first of said sections to lock the same against movement in a direction opposite to that imparted to the said sections by said shaft, and the eccentrically arranged portion of said shaft engaging said support and adapted to impart to said sections a substantially longitudinal movement on said support and the bolt of said support permitting longitudinal movements of said sections.

4. A tool for lathes, comprising a holder, consisting of two sections, whereof one section is provided with substantially radial grooves in each of the faces thereof, and whereof the second section is provided with ratchet notches, a support, a shaft connecting said sections with said support and having an eccentrically arranged extension passing through said support, a head having a recessed flange and adapted to connect the shaft to said support, a spring controlled bolt movably arranged in said shaft and engaging the ratchet notches of said second section, a spring controlled bolt movably arranged in said support and engaging the grooves of said first section contiguous to said support, said shaft when rocked by the head in said support adapted by the bolt arranged therein to rotate said first and by the same said second section in one direction and by the eccentric extension thereof to shift said sections and working tools arranged in grooves of the first section longitudinally to said support first into an inoperative and then back into an operative position, the spring controlled bolt of said support adapted to prevent turning of said sections by a tool, and a rigid bolt carried by said support and adapted to limit the movements of the sections by said shaft by alternately contacting with the end portions of the recessed flange of said head.

In testimony whereof, I have hereunto set my signature in the presence of two witnesses.

WILLIAM P. GEHRIS.

Witnesses:
R. J. BOYER,
D. C. BOYER.